United States Patent
Joshi

(10) Patent No.: US 12,175,122 B2
(45) Date of Patent: Dec. 24, 2024

(54) SIMPLE ELASTIC FILE-BASED MULTI-CLASS STORAGE LAYER (EFMS)

(71) Applicant: Kioxia Corporation, Tokyo (JP)

(72) Inventor: Ratnadeep Mukul Joshi, Sunnyvale, CA (US)

(73) Assignee: KIOXIA CORPORATION, Tokyo (JP)

( * ) Notice: Subject to any disclaimer, the term of this patent is extended or adjusted under 35 U.S.C. 154(b) by 240 days.

(21) Appl. No.: 16/834,407

(22) Filed: Mar. 30, 2020

(65) Prior Publication Data

US 2021/0303204 A1    Sep. 30, 2021

(51) Int. Cl.
    *G06F 3/06*    (2006.01)
(52) U.S. Cl.
    CPC .......... *G06F 3/0659* (2013.01); *G06F 3/0604* (2013.01); *G06F 3/0679* (2013.01)
(58) Field of Classification Search
    CPC ..... G06F 3/0659; G06F 3/0604; G06F 3/0679
    USPC ......................................................... 711/103
    See application file for complete search history.

(56) References Cited

U.S. PATENT DOCUMENTS

| | | | | |
|---|---|---|---|---|
| 9,280,392 | B1* | 3/2016 | Boss | G06F 9/45558 |
| 2008/0271054 | A1* | 10/2008 | Allison | G06F 11/1666 |
| | | | | 719/319 |
| 2014/0208091 | A1* | 7/2014 | Koning | G06F 8/65 |
| | | | | 713/2 |
| 2015/0178010 | A1* | 6/2015 | Chang | G06F 3/064 |
| | | | | 711/170 |
| 2016/0139835 | A1* | 5/2016 | Fiebrich-Kandler | |
| | | | | G06F 3/0665 |
| | | | | 711/114 |
| 2017/0153843 | A1* | 6/2017 | Dewitt | G06F 3/0644 |

* cited by examiner

*Primary Examiner* — Gautam Sain
(74) *Attorney, Agent, or Firm* — Foley & Lardner LLP

(57) ABSTRACT

A method of storing data on a storage appliance with at least one non-volatile memory. The method comprising associating a first portion of a storage capacity of the at least one non-volatile memory to a first application of a plurality of applications, and associating a second portion of the storage capacity of the at least one non-volatile memory to a second application of the plurality of applications. The method also comprises receiving a request to write data associated with the first application to the at least one non-volatile memory and determining that the first portion does not have capacity to store the write data. Additionally, the method comprises requesting the second application to remove data stored in the second portion, reassociating a portion of the storage capacity of the second portion to the first portion, and storing the write data in the first portion.

20 Claims, 6 Drawing Sheets

SIMPLE ELASTIC FILE-BASED MULTI-CLASS STORAGE LAYER (EFMS)

FIELD OF INVENTION

This invention generally relates to storing data on non-volatile memory using a simple elastic file-based multi-class storage layer

BACKGROUND OF THE INVENTION

Solid State Disks (SSDs) are surpassing traditional spinning disk hard drives due to the performance benefits of SSDs. However, traditionally, SSDs have been substantially more expensive than spinning disk hard drives. Further, as with most memory, the larger the capacity of the SSD, the higher the cost of the SSD. As result, only recently have large SSDs (SSDs with capacities in the terabytes) have begun entering the market.

Although SSDs provide a number of advantages over more traditional Hard Disk Drive (HDDs), HDDs are still common and show little sign of being completely replaced by SSDs. Further, HDD technology continues to advance and improve to provide better data storage than previously available to both end users and data storage appliances.

Although the state of the art in SSDs and HDDs continues to advance, a critical point within the chain between applications running on a storage appliance, remote host, or even a personal computer, and the data storage devices, such as an SSD or HDD has seen limited development. This critical point is the file system. Most systems have a file system, sometimes referred to as the file storage layer. File systems control how data is stored or retrieved from a storage medium, such as a SSD of HDD. Without a file system, the data stored on a storage medium would appear as one mass of data without any distinction. Most users are familiar with certain aspects of a file system even if they are not aware of it. For example, file systems are responsible for the ability of storage to be broken down into directories, folders, and files.

While file systems are critical to the operation of modem devices that rely on data storage (i.e. most modem electronics), there has been little development in this area. For example, Windows 10™ by default uses the NTFS file system. Although Windows 10™ is Microsoft's most advance consumer operating system, NTFS actually dates to 1993 when it was introduced as part of Windows 3.1 NT™. Windows is not the only operating system relying on a file system much older than the operating system itself. For example, a number of Linux distros and macOS rely on a Portable Operating System Interface (POSIX) or POSIX-like file system layer to managing data storage.

These and other traditional file systems are largely passive and rely on applications or the operating systems to request data operations and cannot proactively rebalance data storage needs or request the assistance of applications, which are far more aware of what data they are storing and the attributes thereof, in managing data stored on the storage medium. To address some of these short comings, some companies have written certain applications, which the companies know in advance will be cooperating, to allow the applications to communicate with each other in an attempt to proactively manage data needs between the applications. However, there is no standardized approach for cooperative applications and applications that were not originally written in a cooperative fashion, will be unable to leverage these benefits even if it they are running in the same environment as the as the cooperative applications. As a result, this solution has very limited benefits and the needs must be anticipated ahead of time.

Further, current file systems are unable to manage quality of service parameters, such as mirroring and encryption, on a file by file or application by application basis. Rather, current systems manage data in broad strokes for entire partitions or storage mediums at a time.

Accordingly, there is a need and a desire for a way to interact with data storage mediums that is more proactive and where a universal element proactively manages data storage needs and manages each application based on the application's quality of service needs.

BRIEF DESCRIPTION

Certain aspects of the present invention are directed to A method of storing data on a storage appliance with at least one non-volatile memory. The method comprising associating a first portion of a storage capacity of the at least one non-volatile memory to a first application of a plurality of applications, and associating a second portion of the storage capacity of the at least one non-volatile memory to a second application of the plurality of applications. The method also comprises receiving a request to write data associated with the first application to the at least one non-volatile memory and determining that the first portion does not have capacity to store the write data. Additionally, the method comprises requesting the second application to remove data stored in the second portion, reassociating a portion of the storage capacity of the second portion to the first portion, and storing the write data in the first portion.

According to certain embodiments of the present invention, the at least one non-volatile memory is at least one Solid State Disk (SSD).

According to certain other embodiments of the present invention, the method further includes in response to the requesting step, removing data stored in the second portion, wherein the reassociated portion of the storage capacity corresponds to a portion in the second portion from which the data is removed.

According to yet certain other embodiments of the present invention, the request to write data is received from a remote host. According to some embodiments of the present invention, the remote host is a server, personal computer, or smart phone.

According to certain embodiments of the present invention, the method further includes setting a first set of one or more quality of service parameters for the first portion; and setting a second set of one or more quality of service parameters for the second portion.

According to yet other embodiments of the present invention, the method further includes managing the first portion according to the first set of quality of service parameters; and managing the second portion according to the second set of quality of service parameters, wherein the managing of the first portion is independent from the managing of the second portion. According to some embodiments of the present invention the first set and the second set comprise one or more of redundancy, data criticality, encryption, and caching.

According to certain other embodiments, the method further comprises storing critical data in the first portion and storing non-critical data in the second portion.

Certain other aspects of the present invention are directed to a method of storing data on a storage appliance with at least one non-volatile memory. The method includes associating a first portion of a storage capacity of the at least one non-volatile memory to a first application of a plurality of applications, and associating a second portion of a storage capacity of the at least one non-volatile memory to a second application of the plurality of applications. The method also includes storing data associated with the first application in the first portion and storing data associated with the second application in the second portion. Additionally, the method includes assigning a first set of quality of service parameters to the first portion and assigning a second set of quality of service parameters to the second motion. Further, the method also includes managing the first portion according to the first set of quality of service parameters and managing the second portion according to the second set of quality of service parameters, wherein the managing of the first portion is independent from the managing of the second portion.

According to certain embodiments of the certain aspects, the method further includes receiving a request to write data associated with the first application to the at least one non-volatile memory and determining that the first portion does not have capacity to store the write data. Additionally, the method comprises requesting the second application to remove data stored in the second portion, reassociating a portion of the storage capacity of the second portion to the first portion, and storing the write data in the first portion.

DETAILED DESCRIPTION

Figure 1:
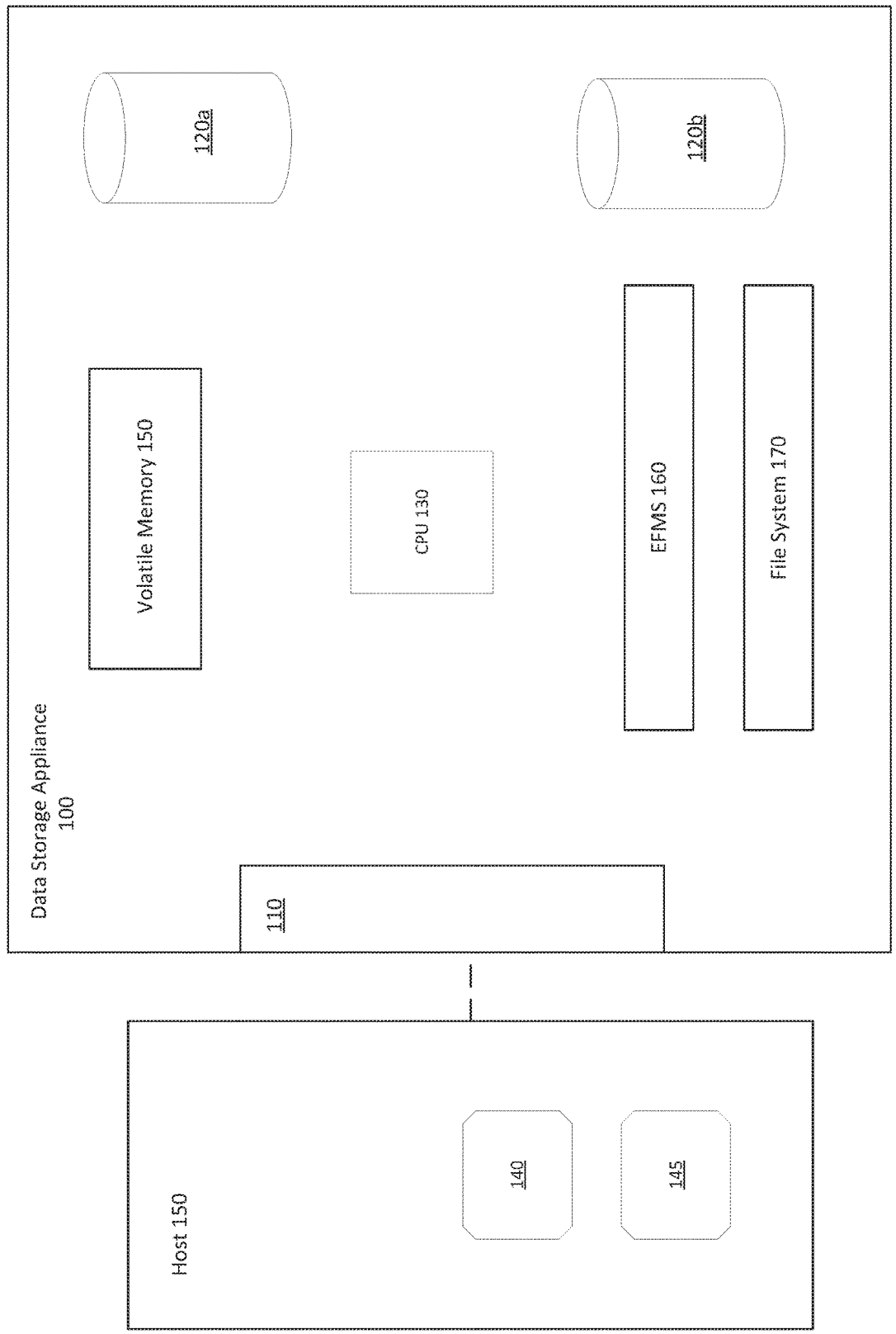
FIG. 1 illustrates a data storage appliance in accordance with certain embodiments describe herein.

FIG. 1 illustrates a data storage appliance 100 in accordance with certain embodiments describe herein. However, a person of ordinary skill in the art would understand that following would also apply to other devices such as a personal computer, smartphone, or other device that stores data in persistent storage.

Data storage appliance may include a host or network interface 110 that allows for the data storage appliance to communicate with other devices such as a remote host. Data storage appliance 100 also has a processor, such as CPU 130 for executing various programs and firmware, which may include the EFMS described, in accordance with certain embodiments, in further detail herein. Additionally, data storage appliance 100 includes volatile memory 150, which can be used for temporarily storing data. For example, volatile memory 150 may temporarily store data received over the host interface 110 prior to writing it to the non-volatile storage devices 120a or 120b.

In certain embodiments, non-volatile storage devices 120a or 120b can be a set of SSDs or HDDs. Additionally, in certain other embodiments, non-volatile storage devices 120a or 120b do not have to be the same type of non-volatile storage. Rather, it is possible for non-volatile storage device 120a to be an SSD and non-volatile storage device 120b to be a HDD and vice versa. Further, a person of ordinary skill in the art would appreciate that a number of other alternatives exist for non-volatile storage 120a or 120b other than SSDs and HDDs without departing from the spirit of the invention. Additionally, although FIG. 1 illustrates a pair of non-volatile storage devices 120a or 120b, a person of ordinary skill in the art would understand that it is possible to implement data storage appliance using any number of non-volatile storage devices without departing from the spirit of the invention.

Data storage appliance 100 also supports a number of applications that rely on the aforementioned resources. These can include applications that store critical data, such as critical data application 140 that cannot be recovered if lost. For example, critical data application 140 may store index data, which stores the metadata for the objects stored on non-volatile storage devices 120a or 120b. Data storage appliance can also run applications that store non-critical data, such as non-critical data application 145. The data stored for non-critical data application 145 is non-critical and its loss will not have a long-term impact on the system. For example, non-critical data application 145 can store cache data. Cache data can be rebuilt from other information stored on non-volatile storage devices 120a or 120b or externally.

According to certain embodiments of the present invention, applications 140 and 145 may run on a remote host 150. The remote host 150 may be a server, a personal computer, or another computing device, such as a smartphone, that relies on data storage appliance 100 to store data. Remote host 150 may communicate with the data storage appliance 100 using the remote host interface 110.

Although FIG. 1 illustrates critical data application 140 and non-critical data application 145 as part of the remote host 150, a person of ordinary skill in the art will understand that this is not required and that many alternatives exist without departing from the spirit of the invention. For example, critical data application 140 and non-critical data application 145 may run in a distributed manner with a number of different devices contributing to the overall function of the application or critical data application 140 and non-critical data application 145 may run on a local device that connects tot data storage appliance over the over a hardwire connection.

Critical data application 140 and non-critical data application 145 can use non-volatile storage devices 120a and/or 120b to store their associated data.

If data storage appliance 100 operates in accordance with traditional approaches, data storage appliance will rely on a traditional passive file system layer 170, such as a POSIX type file system, that passively reacts to data storage requests from the applications or operating system of data storage appliance 100. In such circumstances, the quality of service parameters, such as mirroring of data, encryption, data criticality, and DRAM caching of critical data application 140 and non-critical data application 145 cannot be managed separately for critical data application 140 and non-critical data application 145.

Rather, these parameters are managed on non-volatile storage device basis where nonvolatile storage devices 120a and 120b may have different quality of service parameters associated with them. For example, nonvolatile storage device 120a may be encrypted while nonvolatile storage device 120b is not encrypted. Alternatively, it may possible to partition nonvolatile storage devices 120a and 120b and set quality of service parameters for each partition. However, even in a partitioned approach critical data application 140 and non-critical data application 145 are only managed in accordance with the quality of service parameters of the partition, the file system will not be able proactively manage the data. This may be suitable where the quality of service parameters are limited and clearly know in advance. However, if the desired quality of service parameter for critical data application 140 and non-critical data application 145 needs to be change during operation, the file system will not be able to proactively change how that data is managed.

Moreover, in a traditional approach, data storage appliance 100 can set the amount of storage space designated to a particular application and allocate more free space on nonvolatile storage devices 120a and 120b to the application as needed. However, in such circumstances, data storage appliance 100 will not be able to reclaim space used or associated with critical data application 140 and non-critical data application 145. As a result, if there is no more unassociated free space, data storage appliance 100 will not be able to store further data. Additionally, if either critical data application 140 or non-critical data application 145 is over provisioned and too much storage space is associated with either critical data application 140 or non-critical data application 145 and that space is not fully utilized no other application will be able to use that space, even if the overprovisioned application does not currently need all of the space associated with it.

On the other hand, if data storage appliance 100 further includes an EFMS 160 in accordance with certain embodiments of the present invention as described herein, the EFMS 160 will allow the data associated with critical data application 140 and non-critical data application 145 to be managed in a proactive manner. Further, as described in reference to certain embodiments of the presented invention, the EFMS 160 will also be able to proactively manage rebalance the amount of storage space devote to critical data application 140 and non-critical data application 145 depending on the operating needs of critical data application 140 and non-critical data application 145.

Figure 2:
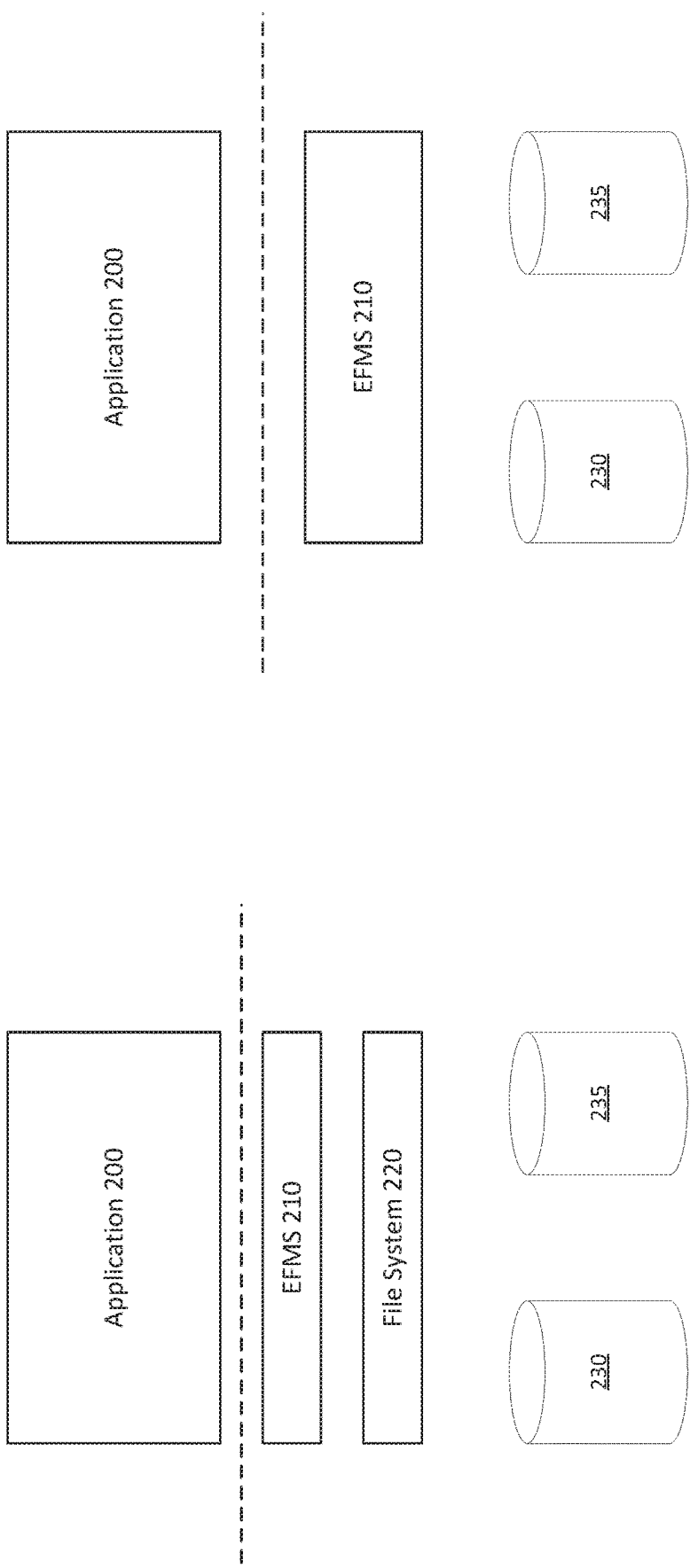
FIG. 2A illustrates the hierarchal data layer stack in accordance with certain embodiments described herein.
FIG. 2B illustrates the hierarchal data layer stack in accordance with certain other embodiments described herein.

FIG. 2A illustrates the hierarchal data layer stack in accordance with certain embodiments of the presented invention. First, it should be noted that a person of ordinary skill in the art would understand FIG. 2A, and likewise FIG. 2B that is discussed below, only show certain part of the hierarchal data layer stack and that other layers and components may exist within the data stack. For example, an operating system layer (not illustrated) may exist between EFMS 210 and file system 220 or application layer 200. Further, non-volatile memory storage devices 230 and 235 may have a number of components that are distinct parts of the stack, such as a flash translation layer. A person of ordinary skill in the art would understand that a number of such components are omitted either for the benefit of simplify the explanation of the data stack as it relates to certain embodiments of the present invention or because they are optional.

At the top of the illustrated data stack is the application layer 200. The application layer is the layer where applications operate. These can include applications that store critical data and application storing non-critical data. Further, these applications may be associated with desire quality of service parameters. The quality of service parameters can include whether the data associated with the application needs to be mirrored and to what extent the data needs to be mirrored (e.g., what level of RAID should be maintained for the data associated with the application). Another example of a quality of service parameter is whether data associated with the application can be purged. For non-critical data application, such as those where the data is cache data, this parameter would indicate that the data can purged or deleted. Yet another possible quality of service parameter is whether the data associated with the application needs to be encrypted. Further still, there can be a quality of service parameter for DRAM caching or other fast memory caching. Caching allows a faster memory than non-volatile memory 230 or 235 to handle certain operations and avoid the need for making calls to non-volatile memory 230 or 235. For example, read data may be cached to allow for quick rereads of the same data within a short period of time or write may be temporarily cached to allow reads of that same data before it is stored in non-volatile memory 230 or 235 or in order to defer the need to write the data immediately to non-volatile memory 230 or 235. A person of ordinary skill in the art would understand that the foregoing are only examples of various quality of service parameters that can be associated with an application and that there many other of quality of service parameters that may be useful for data management in accordance with certain embodiments of the present embodiment.

In certain embodiments of the present invention, the application layer 200 runs on a remote host, while the remainder of the data stack is part of a storage appliance. In FIGS. 2A and 2B, this divide is illustrated by the dotted line. However, a person of ordinary skill in the art would understand that this division is merely an example and that alternative approaches exist, such as the EFMS layer 210 operating on the remote host, without departing from the spirit of the invention.

At the bottom of the stack are non-volatile memory devices 230 and 235, which can be SSDs or other persistent storage devices. Non-volatile memory devices 230 and 235 store the data associated with the application in the application layer, and other data, such as data associated with the operating system.

However, without anything else, the data stored on each non-volatile memory devices 230 and 235 is just organized data blocks of information. File system layer 220 helps organize and manage the data blocks so that they can be stored in a usable and accessible manner. Yet, file system layer 220 is passive and relies on another layer to direct its actions.

In the case of FIG. 2A, EFMS layer 210 is the layer that proactively controls file system layer 210. Unlike, file system layer 220, EFMS layer 210 also can provide a number of complex function calls. As a result, EFMS layer 210 is able to provide more complex data management of the data stored on non-volatile memory devices 230 and 235. This includes managing the data associated with an application from application layer 200 on an application by application basis and in accordance with individual quality of service parameters for each individual application. Additionally, the EFMS 210 can also provide additional functions that allow EFMS 210 to proactively to communicate with the applications in application layer 200. For example, if an application in application layer 200 does not have a quality of service parameter set for data criticality, EFMS 210 can send a request to the application to purge certain data, which the application can do by indicating to either EFMS layer 210 or file system layer 220 to remove the data from non-volatile storage devices 230 and/or 235.

FIG. 2B the hierarchal data layer stack in accordance with certain embodiments of the present invention. The majority of the elements shown in FIG. 2B operate akin to this in FIG. 2A. However, unlike FIG. 2A, the data layer stack of FIG. 2B does not include file system 220. Rather, EFMS 210 operates as the file system.

As described above, a person of ordinary skill in the art would understand that some major advantages of designing EFMS 210 to operate on top of file system 220 is that such a design would be easily incorporated into legacy systems and can allow a system to run applications that are not designed for use with EFMS 210 while allowing application in Application layer 200 that are compatible with EFMS 210 to leverage the numerous benefits of EFMS 210's proactive and granular data management techniques. However, when EFMS 210 runs on top of file system 220, as in FIG. 2A, there may be certain undesirable side effects of file system 220 acting as a middleman between EFMS 210 and non-volatile storage devices 230 and 235. For example, EFMS 210 cannot directly access non-volatile storage devices 230 and 235 and instead must make function calls to file system 220 when managing data on non-volatile storage devices 230 and 235. This would create latency as an extra set of function calls have to be made for any data management operation. Further, as file system 220 was not designed to carry out some of the more complex operation of EFMS 210, some EFMS 210 operations may require multiple file system 220 operation.

The aforementioned issues can be mitigated by designing EFMS 210 such that EFMS 210 can manage that data stored on non-volatile storage devices 230 and 235 without the use of a middle man legacy file system 220. Further, a person of ordinary skill in the art would understand that the aforementioned are merely examples of possible advantages and that other advantages are obtainable by eliminating legacy file system 220 and relying only EFMS 210.

Figure 3:
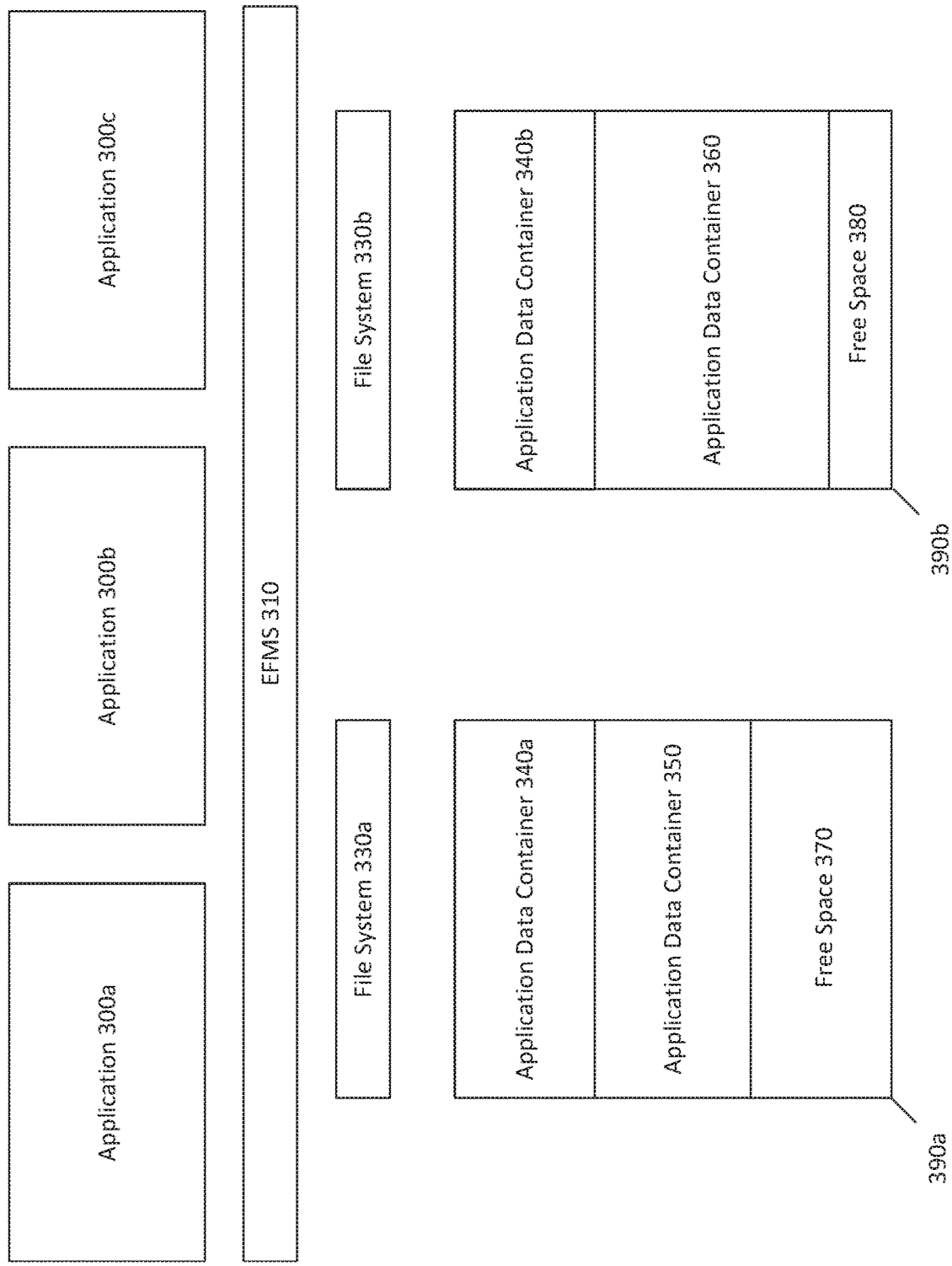
FIG. 3 illustrates that lay out of data storage in accordance with certain embodiments described herein.

FIG. 3 illustrates that lay out of data storage in accordance with certain embodiments of the present invention. Three applications 300a, 300b, and 300c have associated data stored on non-volatile storage devices 390a and 390b. Each of applications 300a, 300b, and 300c have associated quality of service parameters. For example, application 300a has quality of service parameters indicating that its associated data should be mirrored across non-volatile storage devices 390a and 390b, the data is critical and therefore should not be purged, the associated data needs to be encrypted, and that application 300a will not rely on DRAM caching. Conversely, applications 300b and 300c have quality of service parameters indicating that their associated data will not need to be mirrored or encrypted, but the data associated with application 300b and 300c can be purged to reclaim space and both application 300b and 300c will rely on DRAM caching. A person of ordinary skill in the art would understand that other quality of service parameters can be associated with applications 300a, 300b, and 300c without departing from the spirit of the invention. Further, a person of ordinary skill in the art would also understand that not every quality of service parameter needs to be set and that either EFMS 310, the operating system, or something else can be used to set default values for the quality of service parameters. Additionally, a person of ordinary skill in the art would understand that EFMS 310 can also have default methods of treating application if a quality of service parameter is not set.

EFMS 310 leverage file systems 330a and 330b, which may be distinct file systems for each of non-volatile memory device 390a and 390b or one file system that manages both non-volatile memory device 390a and 390b. Further, the existence of separate non-volatile memory device 390a and 390b may be abstract from EFMS 310 such that EFMS 310 only sees a single partitioned non-volatile storage device.

In order to manage the data associated with applications 300a, 300b, and 300c, EFMS 310 sets up data containers for the respective applications. The data containers may each store data associate with a respective application. The data in a container is managed and store according to the quality of service parameters set for the application. One option is for the data application containers to be logical distinctions of data based on each application. Alternatively, the application data containers may be partitions of the non-volatile memory device 390a and 390b based on quality of service parameters, where each partition stores the data associated with applications that share the same quality of service parameters, as is the case with applications 300b and 300c.

In the exemplary set up of FIG. 3, application data containers 340a and 340b store data associated with application 300a. Since application 300a has a quality of service parameter that indicates data should be mirrored, each of the non-volatile memory device 390a and 390b have matching application data containers 340a and 340b. Further, since application 300a has a quality of service parameter that requires the associated data to be encrypted. EFMS 310 encrypts both application data container 340a and 340b Application data container 350 stores data corresponding application 300b and application data container 360 stores data corresponding to application 300c. For each of application data container 350 and 360, EFMS 310 manages the data stored in application data containers 350 and 360 in accordance with the quality of service parameters associated with the respective applications. For example, neither application data container 350 or 360 are mirrored or encrypted.

Another benefit of EFMS 310 proactively managing the data associated with applications 300a, 300b, and 300c, is that EFMS 310 can proactively balance the storage space allocated to the various applications. Although so long as free space 370 and 380 remains on both non-volatile memory devices 390a and 390b, respectively, the application data containers of both non-volatile memory devices 390a and 390b may expand without issue. However, if all of the free space on one or both non-volatile memory devices 390a and 390b has been allocated, the application data containers on the full non-volatile memory storage device will no longer be able to store data. However, EFMS 310 will be able to proactively address this issue in a number of ways.

In one scenario, there may be no free space on one or both of non-volatile memory device 390a and 390b. In such a circumstance, when application 300a, which has critical data, attempts to write to data into non-volatile memory device 390a and 390b, EFMS 310 will encounter an error. However, unlike traditional file systems, EFMS 310 will be able to request that application 300b or application 300c, which both store non-critical data, purge some data from the non-volatile memory device 390a and 390b on which space is needed to store the critical data associated with application 300a. The application which receives the request will be able to determine which data to purge. A person of ordinary skill in the art would understand that different applications that store non-critical data may employ any number of techniques to determine which data should be purged. Some examples include purging the least used data, the data that has been stored the longest, or the most recent data.

In another example, there may be no free space on one or both of non-volatile memory devices 390a and 390b because EFMS 310 may provision the application data containers to include free space. However, a case may arise where the data application container for critical data may not be using all of its allocated storage space, but an application container storing non-critical data has already reached its limit. In such a circumstance, EFMS 310, may rebalance the storage allocation grant to the application data container for non-critical data additional space until the container storing critical data beings to reach its maximum capacity. As the critical data application data container runs out of free space or reaches a predetermined threshold of remaining free space, EFMS 310 can request the application associate with the non-critical data application container purge data the non-critical data application container. Then EFMS 310 will be able to reassign all or a portion of free space allocated to non-critical data application container back to the critical data application container.

Figure 4:
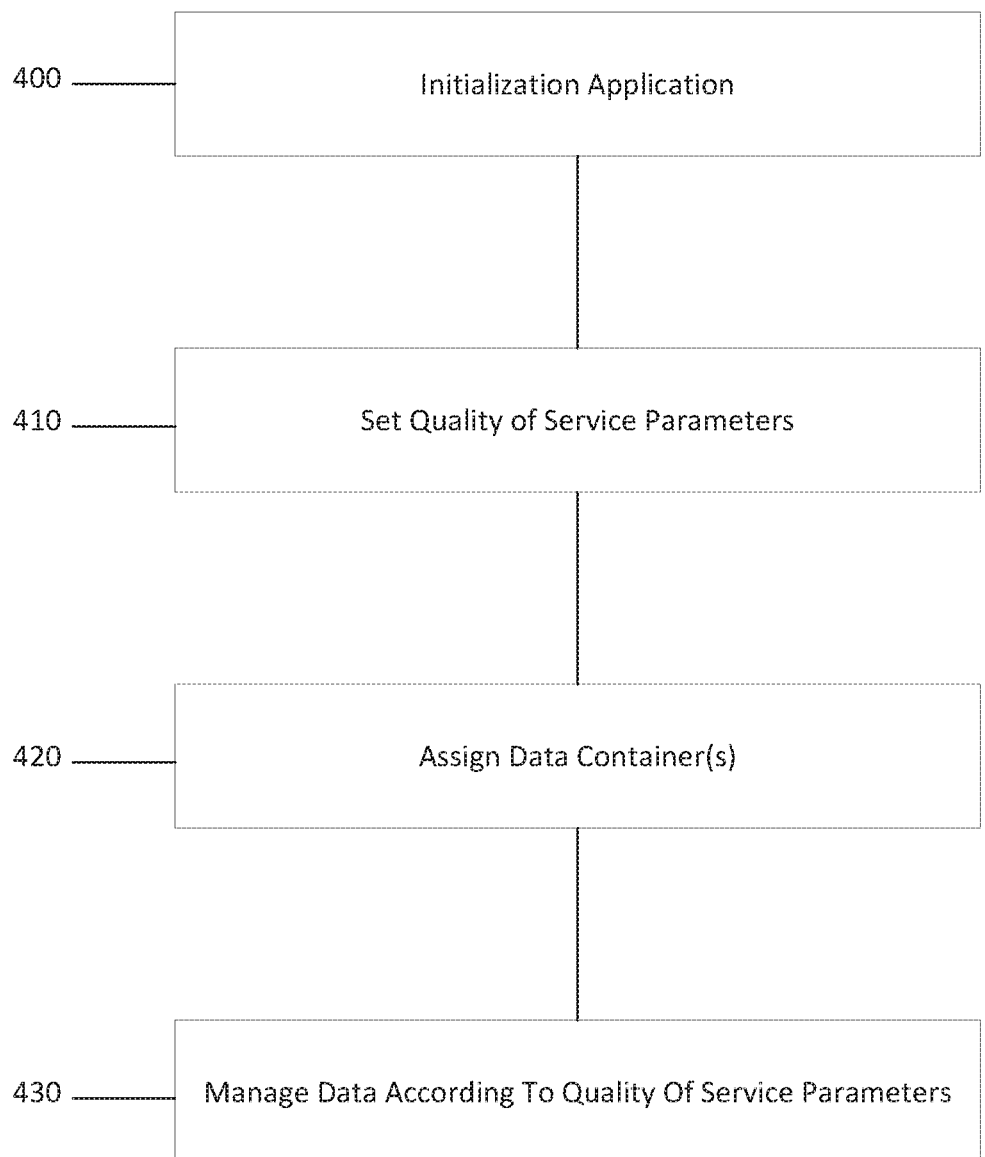
FIG. 4 illustrates a flow chart for managing data in accordance with certain embodiments described herein.

FIG. 4 illustrates a flow chart for managing data in accordance with certain embodiments of the present invention.

At step 400, an application is initialized on either a remote host, or server, on a localized personal computer, or other device.

At Step 410, which may be part of the initialization process or at a later phase, quality of service parameters, such as those mentioned in the foregoing descriptions, are set for the application. As mentioned above, a person of ordinary skill in the art would understand that not all of the parameters may be set and default procedures or settings may apply to an application where a quality of service parameter is not proactively set. A person of ordinary skill in the art would further understand that there are number of different ways to set a quality of service parameter without departing from the spirit of the invention. For example, a quality of service parameter can be set by the user, or an application may be programmed to set its own quality of service parameters, the application may come with an initialization file that the EFMS can read and that contains the quality of service parameters.

At step 420, the EFMS assigns an application data container, in some cases containers, that store the data for the application. In some other embodiments, rather than assigning application data containers, the EFMS may determine an existing partition of the non-volatile storage device(s) that has the same quality of service parameters as the application and designate that partition of application data container(s) the data storage location for the application.

At step 430, the EFMS manages the data for the application in accordance with the quality of service parameters set for the application. For example, if the quality of service parameter for mirroring is set, then the EFMS will ensure that the data associated with the application is stored across additional non-volatile memory devices based what level of mirroring the quality of service parameter requires.

Figure 5:
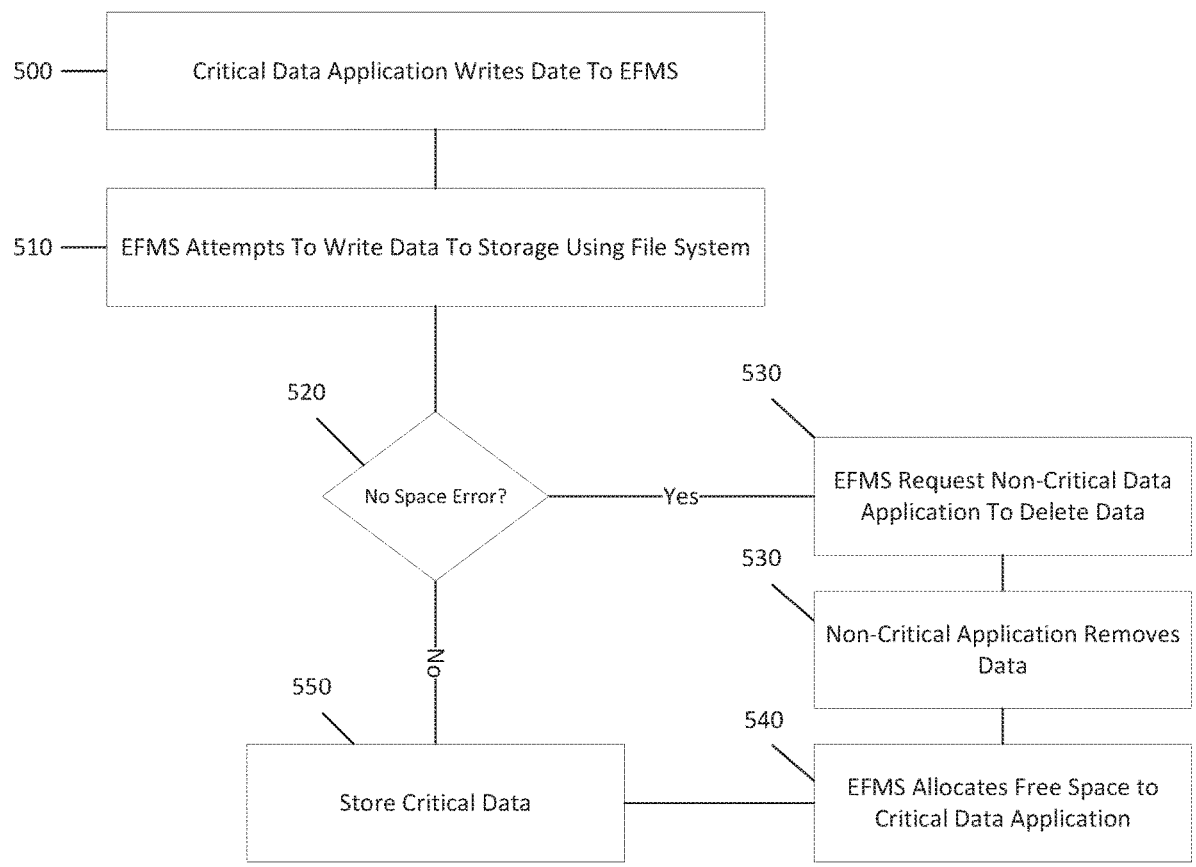
FIG. 5 illustrates a flow chart for storing critical data in accordance with certain embodiments described herein.

FIG. 5 illustrates a flow chart for storing critical data in accordance with certain embodiments of the present invention.

At step 500, a critical data application, which could be an application with a quality of service parameter that indicates that its associated data cannot be purged, or designated as a critical data application in another manner, instructs the EFMS, either directly or through an intermediary such as an operating system, that it needs to store critical data in non-volatile storage. The non-volatile memory storage device may be located on the same device running the application or remotely.

At step 510, the EFMS attempts to write the data to a non-volatile memory storage (or multiple non-volatile storage devices if the critical data application has a quality of service parameter indicating that the data needs to be mirrored). The EFMS can does this through an existing file system layer or directly.

At step 520, EFMS may encounter an out of space error. If the there is available free space on the required non-volatile storage device(s), or the requisite application data containers are overprovisioned and contain unused storage capacity, then the process proceeds to step 550. A person of ordinary skill in the art would understand that there a number of ways to detect a no space error without departing from the spirit of the invention. For example, the EFMS may have a built in ability to check the remaining space on in an application data container or the non-volatile storage device, or the EFMS may catch an exception thrown by the file system layer.

At step 550, the data is stored on the designated non-volatile memory device(s) and managed according to any quality of service parameters designated for the critical data application.

However, if at step 520, the EFMS encounters an out of space error, the process proceeds to step 530.

At step 530, the EFMS will request that a non-critical data application remove some of its data from the requisite non-volatile memory storage device(s). Although it is possible for the EFMS to remove data on its own, a non-critical data application will be able to choose which data to remove in a manner suitable to the needs of the specific application. A person of ordinary skill in the art would understand that there are many such possible techniques, including but not limited to, removing the least used data, the longest short data, or removing the most recently stored data. The EFMS may inform the non-critical data application of the amount of the data that should be purged, or the non-critical data application may purge data in predetermined batches until the EFMS determines that enough data has been remove, or in another fashion. Once enough data is removed by the non-critical application, the process proceeds to step 540.

At step 540, the EFMS will allocate the freed space to the critical data application or the data container/partition that stores the data associated with the critical application. After the space is reallocated, or just marked as free space such that the file system can store any data in the location, the process proceeds to step 550.

As described above, at step 550, the critical data from the critical data application is stored on the non-volatile memory storage device(s).

Figure 6:
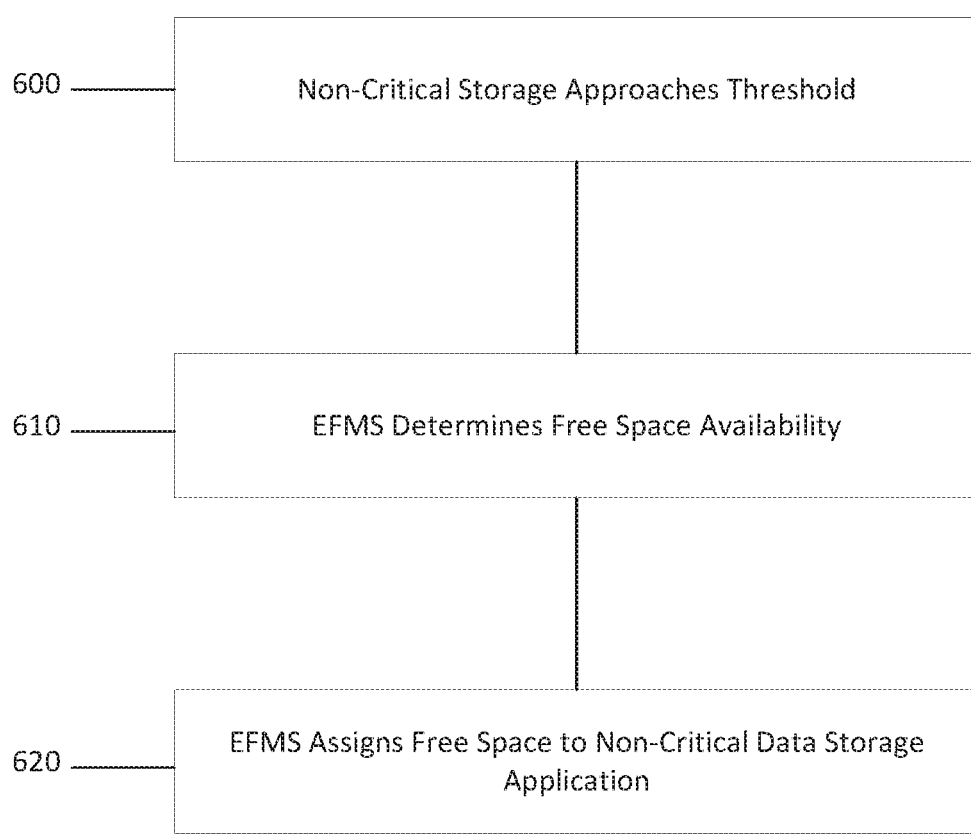
FIG. 6 illustrates a flow chart for managing data storage space for different applications in accordance with certain embodiments described herein.

FIG. 6 illustrates a flow chart for managing data storage space for different application in accordance with certain embodiments of the present invention, which deal with deal with scenarios where critical data application containers or partitions may be over provisioned but not entirely used.

The process begins at step 600 where a non-critical storage container or partition, such as one associated with a non-critical data application like a cache, either runs out of available free space or reaches a predetermined threshold.

At step 610, the EFMS determines the availability of free/unused space on a non-volatile memory device. The free space can be unallocated space, or unused space in an overprovision critical data application container or partition. If there is no free space, the EFMS may request that the non-critical data application purge some of its data, or that another non-critical application with a lower tier of data criticality purges some of it data to create free space that can then be associated with non-critical data application that has reached the threshold of its storage. However, if there is free/unused storage capacity on a non-volatile memory device, the process proceeds to step 620.

At step 620, the EFMS can assigns the free space to the non-critical data storage application or partition. This may involve disassociating the space from an overprovision critical data application container or partition that is not using all of its allocated storage capacity.

One of the advantages of the EFMS is that the process of FIG. 6, and other processes, can be carried by the EFMS on its own and during the active operation of the personal computer or data storage appliance. Further, the process of FIG. 6 is easily reversible should a critical data application require more storage capacity because the EFMS can proactively request that a non-critical data application free up storage capacity by purging data in a manner best suited to the particular non-critical application.

Although the foregoing flow charts is described in reference to an application, a person of ordinary skill in the art would understand that the proactive data management techniques employed by the EFMS can be employed on different levels of granularity without departing from the spirit of the invention. For example, the EFMS can manage data, based on quality of service parameters for distinct partitions, on a file by file basis, or a directory by directory basis.

It should also be noted that the while some of the quality service parameters are discussed in a binary state, this does not have to be the case. A person of ordinary skill in the art would understand that quality of service parameters may have different levels. For example, the level of redundancy, which may be mirroring or a number of other redundancy techniques, may be different for different application (e.g., RAID-1 for one application and RAID-5 from another). Another example is that the mode or type of encryption may vary (e.g., AES-CBC for one application and XTS-AES for another). A person of ordinary skill in the art would understand there can be more quality of service parameters than the aforementioned examples and that each of these quality of service parameters may have a number of different levels without departing form the spirit of the invention.

Other objects, advantages and embodiments of the various aspects the certain embodiments described herein will be apparent to those who are skilled in the field of the invention and are within the scope of the description and the accompanying Figures. For example, but without limitation, structural or functional elements might be rearranged consistent with the certain embodiments described herein. Similarly, principles according to the certain embodiments described herein could be applied to other examples, which, even if not specifically described here in detail, would nevertheless be within the scope of certain embodiments described herein.

Further, a person of ordinary skill in the art would understand that certain aspects of this invention, such as the various controllers, may be implemented as hardware, software, firmware or a combination thereof. The descriptions of such elements in certain embodiments described herein are not intended to limit the implementation of these types of elements to a singular implementation. A person of ordinary skill in the art would appreciated that there are number ways to implement certain elements of certain embodiments described herein without departing from the spirit of the invention itself.

Additionally, elements reference throughout certain embodiments described herein can be divided into certain sub-elements, combined, or duplicated without departing from the spirit of the invention.

What is claimed:

1. A method of storing data on a storage appliance comprising at least one non-volatile memory and an elastic file-based multi-class storage layer (EFMS), the method comprising:
    associating, via the EFMS, a first portion of a storage capacity of the at least one non-volatile memory to a first application of a plurality of applications;
    associating, via the EFMS, a second portion of the storage capacity of the at least one non-volatile memory to a second application of the plurality of applications;
    receiving a request to write data associated with the first application to the at least one non-volatile memory;
    determining that the first portion does not have capacity to store the write data;
    requesting, via the EFMS, the second application to remove data stored in the second portion from the storage appliance;
    reassociating, via the EFMS, a portion of the storage capacity of the second portion to the first portion; and
    storing the write data in the first portion.

2. The method of claim 1, wherein the at least one non-volatile memory is at least one Solid State Disk (SSD).

3. The method of claim 1, wherein the method further comprises:
    in response to the requesting step, removing data stored in the second portion, wherein the portion of the storage capacity that has been reassociated corresponds to a portion in the second portion from which the data is removed.

4. The method claim 1, wherein the request to write data is received from a remote host.

5. The method of claim 4, wherein the remote host is a server, personal computer, or smartphone.

6. The method of claim 1, the method further comprising:
    setting a first set of one or more quality of service parameters for the first portion; and
    setting a second set of one or more quality of service parameters for the second portion.

7. The method of claim 6, the method further comprising:
    managing the first portion according to the first set of quality of service parameters; and
    managing the second portion according to the second set of quality of service parameters, wherein the managing of the first portion is independent from the managing of the second portion.

8. The method of claim 6, wherein the first set and the second set of quality of service parameters comprise one or more of redundancy, data criticality, encryption, and caching.

9. The method of claim 1, wherein the method further comprises:
    determining there is unused storage capacity in the first portion; and
    associating the unused storage capacity of the first portion to the second portion.

10. The method of claim 1, wherein the method further comprises:
    storing critical data in the first portion, and storing non-critical data in the second portion.

11. The method of claim 1, wherein the step of requesting comprises requesting, via the EFMS, the second application to remove at least one of the least used data, the longest stored data, or the most recently stored data from the second portion.

12. A method of storing data on a storage appliance comprising at least one non-volatile memory and an elastic file-based multi-class storage layer (EFMS), the method comprising:

associating, via the EFMS, a first portion of a storage capacity of the at least one non-volatile memory to a first application of a plurality of applications;
  associating, via the EFMS, a second portion of a storage capacity of the at least one non-volatile memory to a second application of the plurality of applications;
  storing data associated with the first application in the first portion;
  storing data associated with the second application in the second portion;
  assigning a first set of one or more quality of service parameters to the first portion;
  assigning a second set of one or more quality of service parameters to the second portion;
  managing the first portion according to the first set of quality of service parameters; and
  managing the second portion according to the second set of quality of service parameters, wherein the managing of the first portion is independent from the managing of the second portion, and managing the second portion includes requesting, via the EFMS, the second application to remove data stored in the second portion from the storage appliance and reassociating, via the EFMS, a portion of the storage capacity of the second portion to the first portion.

13. The method of claim 12, wherein the first set and the second set of quality of service parameters comprise one or more of redundancy, data criticality, encryption, and caching.

14. The method of claim 13, wherein the at least one non-volatile memory is at least one Solid State Disk (SSD).

15. The method of claim 13, wherein the method further comprises:

receiving a request to write data associated with the first application to the one of the at least one non-volatile memory;
  determining that first portion does not have capacity to store the write data;
  requesting the second application to remove data stored in the second portion;
  reassociating a portion of the storage capacity of the second portion to the first portion; and
  storing the write data in the first portion.

16. The method of claim 13, wherein the method further comprises:

in response to the requesting step, removing data stored in the second portion, wherein the reassociated portion of the storage capacity corresponds to a portion in the second portion from which the data is removed.

17. The method of claim 16, wherein the method further comprises:

determining there is un-used storage capacity in the first portion; and
  associating the un-used storage capacity of the first portion to the second portion.

18. The method claim 16, wherein the request to write data is received from a remote host.

19. The method of claim 18, wherein the remote host is a server, personal computer, or smartphone.

20. The method of claim 16, wherein the method further comprises, the data associated with the first application is critical data, and the data associated with the second application is non-critical data.

* * * * *